(12) United States Patent
Rajsic

(10) Patent No.: US 7,542,432 B2
(45) Date of Patent: Jun. 2, 2009

(54) RESOURCE MATCHED TOPOLOGY DATABASE SYNCHRONIZATION IN COMMUNICATIONS NETWORKS HAVING TOPOLOGY STATE ROUTING PROTOCOLS

(75) Inventor: Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 602 days.

(21) Appl. No.: 11/259,167

(22) Filed: Oct. 27, 2005

(65) Prior Publication Data

US 2007/0097880 A1    May 3, 2007

(51) Int. Cl.
*H04L 12/28* (2006.01)
(52) U.S. Cl. ..................... 370/254; 370/408
(58) Field of Classification Search ............... 370/238, 370/254, 324, 408, 477
See application file for complete search history.

(56) References Cited

U.S. PATENT DOCUMENTS

| | | | |
|---|---|---|---|
| 6,178,172 B1 * | 1/2001 | Rochberger | 370/395.32 |
| 6,950,427 B1 | 9/2005 | Zinin | |
| 2002/0023163 A1 * | 2/2002 | Frelechoux et al. | 709/230 |
| 2002/0124106 A1 * | 9/2002 | Dolganow et al. | 709/242 |

FOREIGN PATENT DOCUMENTS

EP    1189384    3/2002

OTHER PUBLICATIONS (Spiegel, et al.), PNNI Routing Resynchronization Control, Version 1.0, The ATM Forum, Technical Committee, Jun. 2004, XP002437491, pp. 1-52.
(Spiegel, et al.), PNNI Routing Congestion Control, Version 1.0, The ATM Forum, Technical Committee, Jun. 2004, XP002437492, pp. 1-40.
Moy, J., OSPF Version 2, Ascend Communications, Inc., Apr. 1998.
The ATM Forum Technical Committee Private Network-Network Interface Specification Version 1.1, Apr. 2002.

* cited by examiner

*Primary Examiner*—Chirag G Shah
*Assistant Examiner*—Daniel Mitchell

(57) ABSTRACT

A method for selecting a neighboring node to synchronize network topology database information with a network node from among a plurality of neighboring nodes coupled to the network node in a network, the method comprising: receiving from each of the neighboring nodes an identifier and an indication as to whether synchronization resources have been assigned to the network node; comparing by magnitude the identifier of the neighboring node with identifiers of others of the neighboring nodes to determine whether to synchronize with the neighboring node; and, synchronizing with the neighboring node if the neighboring node has assigned synchronization resources to the network node.

30 Claims, 6 Drawing Sheets

RESOURCE MATCHED TOPOLOGY DATABASE SYNCHRONIZATION IN COMMUNICATIONS NETWORKS HAVING TOPOLOGY STATE ROUTING PROTOCOLS

FIELD OF THE INVENTION

The present invention relates generally to the field of network topology database synchronization in communications networks having topology state routing protocols and more particularly, to a method and apparatus for effecting resource matched network topology database synchronization in such networks. By way of example only, the present invention is suited to database synchronization in the context of an outage recovery following a network failure or in other circumstances leading to a network restart condition.

BACKGROUND OF THE INVENTION

Topology state routing protocols are employed in communications networks in order to disseminate or advertise topology state information among nodes and node clusters within such networks. The advertised topology state information is in turn utilized to compute optimized paths for communications throughout a given network. As typically understood by those skilled in this art, topology state information signifies state information for the network domain as a whole. On the other hand, reference is typically made in the art to local state information when dealing with state information which is locally originated by a particular network node. Local link status information will reflect a given node's understanding of the status of communication with its peer nodes. In the present application, reference to state information will signify both topology state information and local state information.

The state information for a network topology is typically stored in a synchronization database, also called a topology database, which is associated with each network node of a routing domain. Typically, the synchronization database will be stored within the network nodes in question. Database synchronization is an existing topology state routing protocol mechanism which ensures that adjacent nodes within a network share a common view of the overall topology of the network. A network node may be a switch, a router, or other data processing system.

When multi-node network architectures that operate according to topology state routing protocols are initialized, for instance at protocol startup after a network outage, the topology databases of the various nodes of the network must each be synchronized with those of their respective neighboring nodes. As known to those of skill in this art, such synchronization of the topology databases as aforesaid is required in order for routing information to be shared so as to allow the data services of each network node to be used. When synchronization between two neighboring nodes is complete, the link between such neighboring nodes can be utilized for the provision of data services.

As understood to those skilled in the art, synchronization between two neighboring nodes is performed according to varying techniques. In the Private Network-Node Interface or Private Network-to-Network Interface ("PNNI") protocol, by way of example, such synchronization is conducted in two stages. First, messages are dispatched by each of the network nodes according to the known "Hello" protocol in order to establish two-way communications with neighboring nodes. Second, topology database information is exchanged between such neighboring nodes until their topology state databases are synchronized. The PNNI protocol is specified in a document entitled "Private Network Interface Specification Version 1.1", ATM Forum Document No. af-pnni-0055.002, dated April, 2002 (the "PNNI Specification"). The PNNI Specification is hereby incorporated by reference. The acronym "ATM", of course, stands for "Asynchronous Transfer Mode".

The synchronization described above must take place between and among all neighboring nodes that are affected by a network outage or other cause of network or nodal failure. The synchronization should be performed and completed as quickly as practicable in order to reduce network convergence time, thereby with a view to lessening the non-availability of network services during startup and minimizing the time when the network is not operational on account of the disruption of its routing behaviour.

The discussion above has addressed the impact of a failure affecting a network. However, it will be appreciated by those versed in this art that a failure concerning one or more physical or logical nodes may also result in some measure of disruption to the routing capabilities of the neighboring nodes or devices that are serviced by the failed ordinary node. Although in some node architectures it may be possible to retain certain network functions such as packet forwarding or call processing in the event of a routing function failure, topology state protocols such as PNNI require each network node of a domain to synchronize a topology database with its neighbors before being admitted to the routing system. Such topology database synchronization must take place in these network protocols in order to recover from the failure of a node. The synchronization process may consume seconds or minutes or longer in the overall scheme of recovery, depending on the circumstances. This recovery time may be such as to be unacceptable to service providers or end users. One reason why the recovery time may be lengthy is that most implementations have limited database synchronization resources that must be shared. If all nodes trying to participate in a network failure recovery have a limited amount of resources, then there needs to be a controlled way to ensure these nodes use these resources optimally to make the network recovery as efficient as possible, otherwise, recovery delays as mentioned above can be expected.

During the synchronization, network devices serviced by a failed node will be impacted and hence routing functionality may very well suffer disruption. While the discussion above has focussed on the challenges surrounding recovery from a network failure, those skilled in this art will understand that analogous problems arise stemming from other events which would require a node to undertake a synchronization of its topology database, for instance a failure at the network node level or a reset of the routing processor associated with a network node. By way of example, in some topology state protocols, certain nodes in a communications network may take on distinguished or additional responsibilities in order to make the routing function for the network operate properly. In the Open Shortest Path First ("OSPF") IP routing protocol as described in J. Moy: "OSPF Version 2", STD 54, RFC 2328, dated April, 1998, a node identified as the Designated Router ("DR") would assume such responsibilities. Similarly, in the PNNI protocol, responsibilities of this nature are assumed by a node termed the Peer Group Leader ("PGL"). As compared to the failure of an ordinary network node, a failure affecting a physical node designated with the foregoing additional responsibilities may conceivably impact a relatively larger portion of the network involving network nodes that are dependent from the said failed node. If there is a delay in the database synchronization process (i.e., by not having a controlled way of synchronizing a larger number of nodes each having limited database synchronization resources) of the dependent nodes, then the PGL or DR function may also be delayed. Hence, a greater number of nodes may be impacted due to this delay.

As known to those skilled in this art, current procedures and methodologies in respect of synchronization require that all affected neighboring nodes be involved simultaneously in a network restart or recovery. However, as network sizes increase and the number of neighbors that each network node must synchronize with grows, synchronizing databases with multiple neighbors at once is becoming increasingly problematic because the process of synchronization is highly resource intensive. Many nodal resources are called upon to engage in synchronization activity with a neighboring node, be they those relating to memory, buffer management or processing capabilities. Synchronizing all affected neighboring nodes at the same time can therefore impede the performance of the synchronizing nodes such that all or a part of the synchronizing nodes may not ultimately achieve synchronization in all cases. Alternatively, the resource commitments as previously described according to known methods of synchronization may be such as to cause the synchronization process to stall and to be restarted. This potentially could negatively affect the startup time pertaining to the entirety of the network, and in certain cases the synchronizing network nodes may become so overwhelmed as to cause cascading failures in the node until the node is inoperable. Furthermore, in larger network architectures, the synchronization burden may be so great under current practices as to require network restart one network node at a time to ensure a proper re-establishment of the routing functionality of the network. This is also very cumbersome, manually intensive, and increases the time it takes the failed network to recover.

More recent approaches to network synchronization have sought to limit the number of nodal neighbors that any given network node can attempt to synchronize with at the same time. For instance, those skilled in this art understand that this limit can be the engineered maximum number of simultaneous synching neighbors for the node. Typically, the maximum number of synchronization neighbors is much less than the maximum number of neighbors supported by the node for routing purposes. The latter number continues to grow as networking requirements worldwide continue to increase. As the latter number continues to grow, while the former does not grow as much, the probability of multiple nodes selecting the same pair of nodes to synchronize with at the same time goes down, which increases the expected convergence and recovery time. If pair-wise re-synchronization is not controlled, and left to random chance as is the case in present networks, the network may never recover at all, seriously impacting services.

Accordingly, prior art topology state routing protocols present problems and challenges when faced with a situation of recovery from a nodal failure or with other situations which may require a node to synchronize its topology database once it has previously done so, and these problems and challenges arise whether or not the node immediately affected by the failure has distinguished responsibilities. First, known recovery mechanisms typically disrupt the routing functions of at least a part of a network and cause a service impact to certain of the devices utilizing the network. The portion of the network affected will vary in the circumstances. For instance, the impacted portion of the network can be expected to be more extensive for a node performing distinguished functions than is the case for a node that does not perform such functions. As well, the impacted portion can be expected to be more expansive for a failure concerning a PNNI Peer Group Leader than for one which influences an OSPF Designated Router. Second, the time required to recover from a node or link failure will vary, but may be in the order of up to several minutes or longer. The reasons for recovery delay include a large number of neighbors to synchronize with, limited database synchronization resources, and mismatched neighbors that can lead to a "haphazard" process for re-synchronizing and recovering the failed portion of the network. As mentioned above, this time frame may be unacceptable to certain service providers or end users. Third, since many nodes will have to be made aware of the failure and are therefore required to participate in the recovery process, network resources in the nature of bandwidth and processing time will be diverted. This will detract from other network activities in general and may decrease the performance and stability of the network routing system in particular for a longer than necessary period of time.

A need therefore exists for an improved method and system for node re-synchronization in communications networks. Accordingly, a solution that addresses, at least in part, the above and other shortcomings is desired.

SUMMARY OF THE INVENTION

According to one aspect of the invention, there is provided a method for selecting a neighboring node to synchronize network topology database information with a network node from among a plurality of neighboring nodes coupled to the network node in a network, the method comprising: receiving from each of the neighboring nodes an identifier and an indication as to whether synchronization resources have been assigned to the network node; comparing by magnitude the identifier of the neighboring node with identifiers of others of the neighboring nodes to determine whether to synchronize with the neighboring node; and, synchronizing with the neighboring node if the neighboring node has assigned synchronization resources to the network node.

The method may further include assigning synchronization resources to the neighboring node. The method may further include sending an indication of assignment of synchronization resources to the neighboring node. The synchronization resources may be at least one of node memory, node input/output capacity, and node processor capacity. Each identifier may be at least one of a unique value, an Internet Protocol ("IP") address, an Asynchronous Transfer Mode ("ATM") address, and a node identification ("ID") number, or any other assigned value for the purposes of providing each node a unique value and weighting that can be distinguished and prioritised from others. The indication may be a flag and the identifier may be a field contained in one or more messages communicated over the network. The network may be an ATM network. The messages may be at least one of Private Network-Node Interface ("PNNI") Hello protocol messages and PNNI database summary packets. The network node and each of the plurality of neighboring nodes may be at least one of a router, a switch, and a data processing system. The method may further include receiving an indication of priority to synchronize with the network node from each of the neighboring nodes. The method may further include comparing a priority of the neighboring node with priorities of others of the neighboring nodes to determine whether to synchronize with the neighboring node. And, the step of comparing may further include determining whether the neighboring node belongs to a group of neighboring nodes having one of largest and smallest identifier magnitudes, the group having a number of neighboring nodes determined by synchronization resources available within the network node.

In accordance with further aspects of the present invention there is provided an apparatus such as a data processing system (e.g., a network node), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the communication systems, computer systems, network elements, network nodes, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

Figure 1:
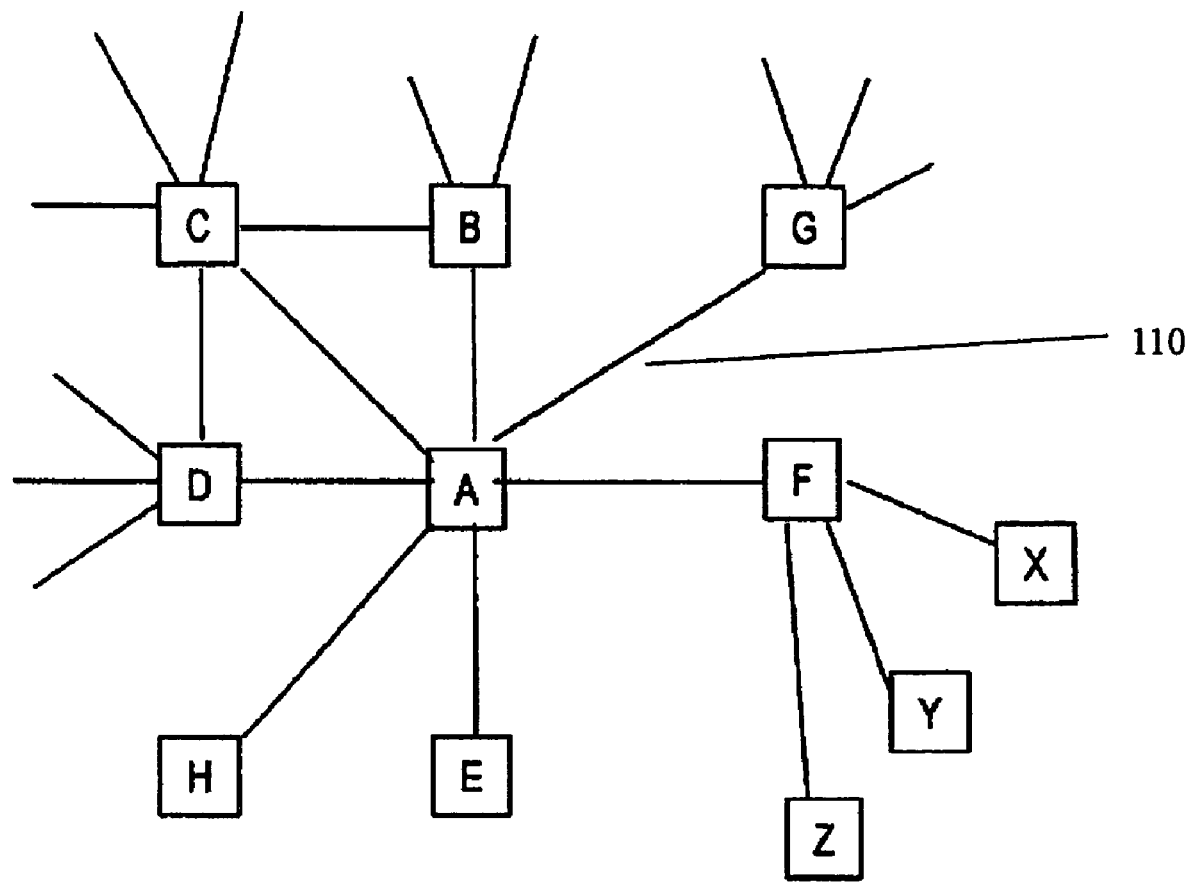
FIG. 1 is a block diagram illustrating neighboring network nodes in a portion of an exemplary communications network.

FIG. 1 is a block diagram illustrating neighboring network nodes A, B, C, D, E, F, G, H, X, Y, Z in a portion of an exemplary communications network 100. Each network node has neighboring nodes as shown. Neighboring network nodes are coupled by communications links 110 to form the network 100. The communications links 110 may be fibre optic links, twisted pair links, radio links, etc. For example, the neighboring nodes for node F are nodes A, X, Y, and Z. The network 100 may include additional nodes not shown in FIG. 1. The presence of these additional nodes is indicated by opened ended links 110. For example, node C is coupled to nodes A, B, and D and to three additional nodes that are not shown but are indicated by respective open ended links 110.

At protocol start-up (e.g., after a network outage), each node (e.g., F) needs to synchronize its database with the databases of its neighbors (e.g., A, X, Y, and Z) in order to synchronize routing information to allow data services of the node F and network 100 to be used. When synchronization between two neighbors (e.g., F and X) is complete, the link 110 between the neighbors F, X can be used for data services. According to known methods, synchronization between two neighbors F, X is typically performed in two stages as follows:

1. Hello messages are sent to establish two-way communications with neighboring nodes, via the Hello protocol; and,
2. Database information is exchanged between the neighbors until their databases are synchronized.

This synchronization must take place between all neighbors that were affected by the network outage. It is best to perform this synchronization as quickly as possible in order to reduce the network convergence time, thereby reducing the negative impact on services and minimizing the amount of time the network 100 is not operational.

As mentioned above, previous approaches to network synchronization at start-up had each node synchronizing with all of its neighbors simultaneously. However, as network sizes increase and the number of neighbors that each node must synchronize with grows, synchronizing databases with multiple neighbors at once is becoming increasingly difficult (i.e., resource intensive). Persons knowledgeable in the art will understand that many nodal resources are required to synchronize with a neighboring node (e.g., memory, buffer management, CPU, etc.). Synchronizing all neighbors simultaneously can seriously impact a node's performance. For example, such simultaneous synchronization may result in no neighbors synchronizing, a limited number of neighbors synchronizing, or the stalling of synchronization and the resulting need to restart the synchronization. This can negatively affect the entire network 100 at start-up time. In extreme cases, the nodes A, B, C, D, E, F, G, H, X, Y, Z could be so overwhelmed as to cause cascading failures in the node until the node is inoperable. Furthermore, in very large networks, many nodes could be negatively affected by this large synchronization burden. Indeed, the network 100 might even need to be started up one node at a time to facilitate network start-up.

Recent approaches to solving this synchronization problem involve limiting the number of neighbors a node can attempt to synchronize with simultaneously to an engineered maximum number of simultaneous synching neighbors for the node. Typically, the maximum number of synching neighbors is much less than the maximum number of neighbors supported by a node, while the maximum number of neighbors supported by the node continues to grow. For example, in early approaches, a node was limited to simultaneously synchronize with six of its maximum 100 neighbors. In later approaches, these limits were increased to 6 and 300, respectively. Interestingly, the ATM Forum has recently adopted the concept of limiting simultaneous synchronization of neighboring nodes, as defined in the PNNI Specification.

Figure 2:
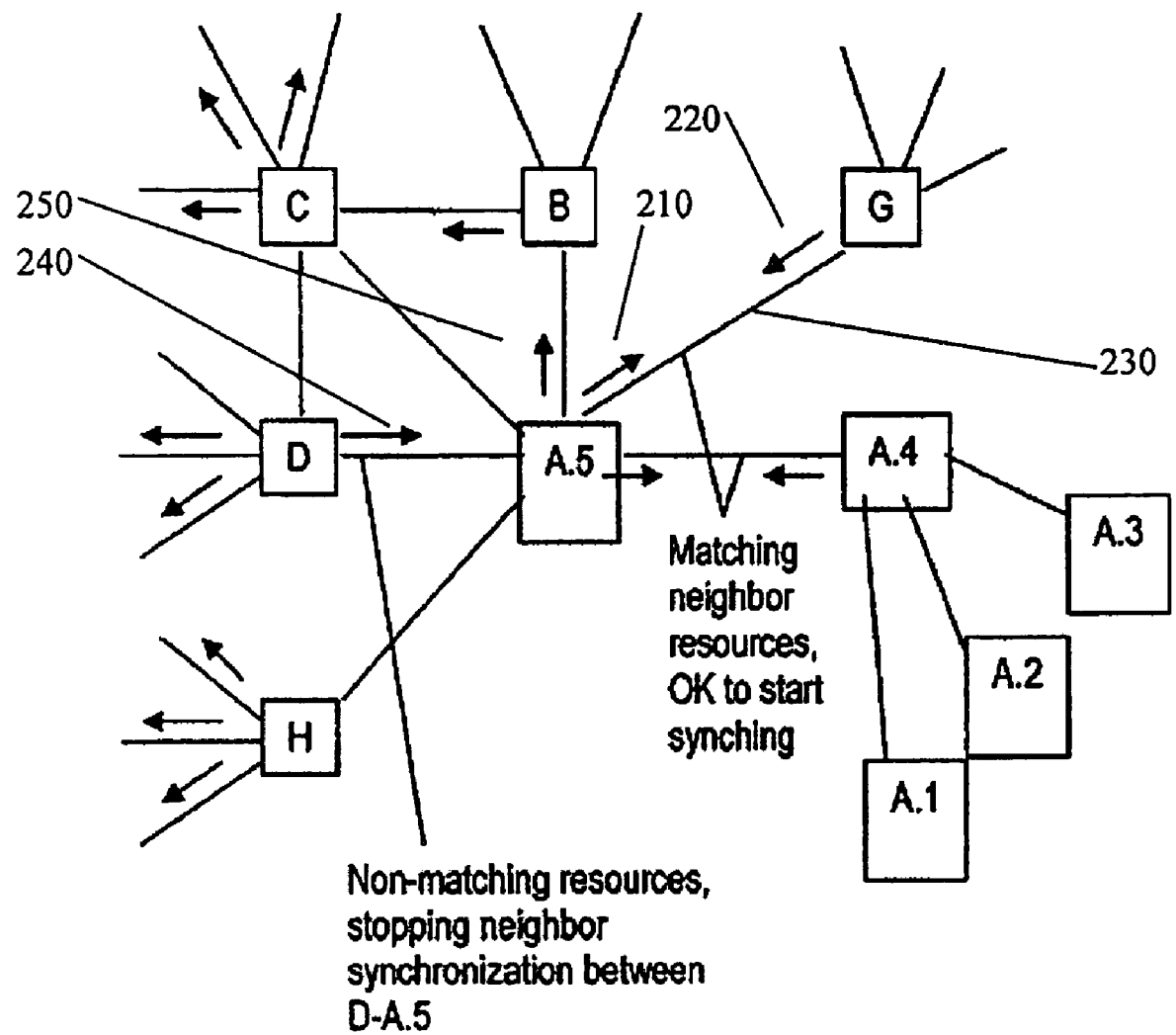
FIG. 2 is a block diagram illustrating the synchronization problem between neighboring nodes in a portion of an exemplary communications network.

FIG. 2 is a block diagram illustrating the synchronization problem between neighboring nodes in a portion of an exemplary communications network 200. The synchronization problem occurs because the selection of simultaneous neighbors based on free synchronization resources (e.g., memory, buffer management, CPU, etc.) is random. Hence, if two neighbors do not select one another, then synchronization is delayed and network convergence is negatively impacted. As two-way communications are established (i.e., using the Hello protocol) between a given node and its neighbors, each node arbitrarily picks three neighbors to synchronize with and assigns a portion of its synchronization resources to each of these selected neighbor nodes. Assigned synchronization resources are indicated in FIG. 2 by an arrow (e.g., 210) pointing along a communication link 230 from a given node (e.g., node A.5) toward its neighboring node(s) (e.g., node G). The synchronization process starts between two neighboring nodes (e.g., A.5, G) when each node has assigned synchronization resources (e.g., 210, 220) to the other node. When synchronization starts, the synchronization resources 210 and 220 that were assigned to their respective neighbor nodes G and A.5, are put to use. In FIG. 2, the matching assignment of synchronization resources 210 and 220 between nodes A.5 and G allows the synchronization process between these two nodes to start. Resources assigned by a first node to a selected second node when that selected second node has not assigned its resources to the first node (e.g., D and A.5, A.5 and B, B and C in FIG. 2) go unused until that second node assigns its own resources to the first node. In this case, the non-matching assignment of synchronization resources prevents the initiation of synchronization between the nodes.

Note that each node does not know whether its neighboring node has assigned resources to it or vice versa. In order to ensure that resources are not stranded and that the network can converge, a time-out period is usually implemented. If synchronization has not occurred within the time-out period, then the first node will re-assign its synchronization resources to a third neighboring node in the hope that the third neighboring node has assigned its resources to the first node. The time-out period is typically much longer than that for performing a neighbor synchronization (e.g., 10 seconds versus 5 minutes). Since this selection is random (i.e., hit and miss), and since the time-out for selecting new neighbors for synchronizing with is typically greater than the time for actually performing the synchronization, complete network synchronization (and convergence) can be very slow. Hence, services provided may be detrimentally affected.

Thus, during a large network outage (or network re-start), the network synchronization process does not efficiently utilize the synchronization resources because pair-wise synchronization between two neighbors is randomly selected (i.e., hit and miss) where there is a miss (e.g., synchronization resources 240 and 250 relating to nodes D and A.5, respectively, in FIG. 2). When mutual selection is not immediate (e.g., D and A.5 in FIG. 2), synchronization resources go unused until resources are re-assigned (e.g., after a time-out), in a similar random fashion, and a mutual selection is randomly made. This results in unpredictable synchronization behaviour which in turn can lead to very long network synchronization times, especially when the number of neighboring nodes supported in the network is large and when the maximum number of simultaneous synchronizing neighbors for each node is relatively small.

Figure 3:
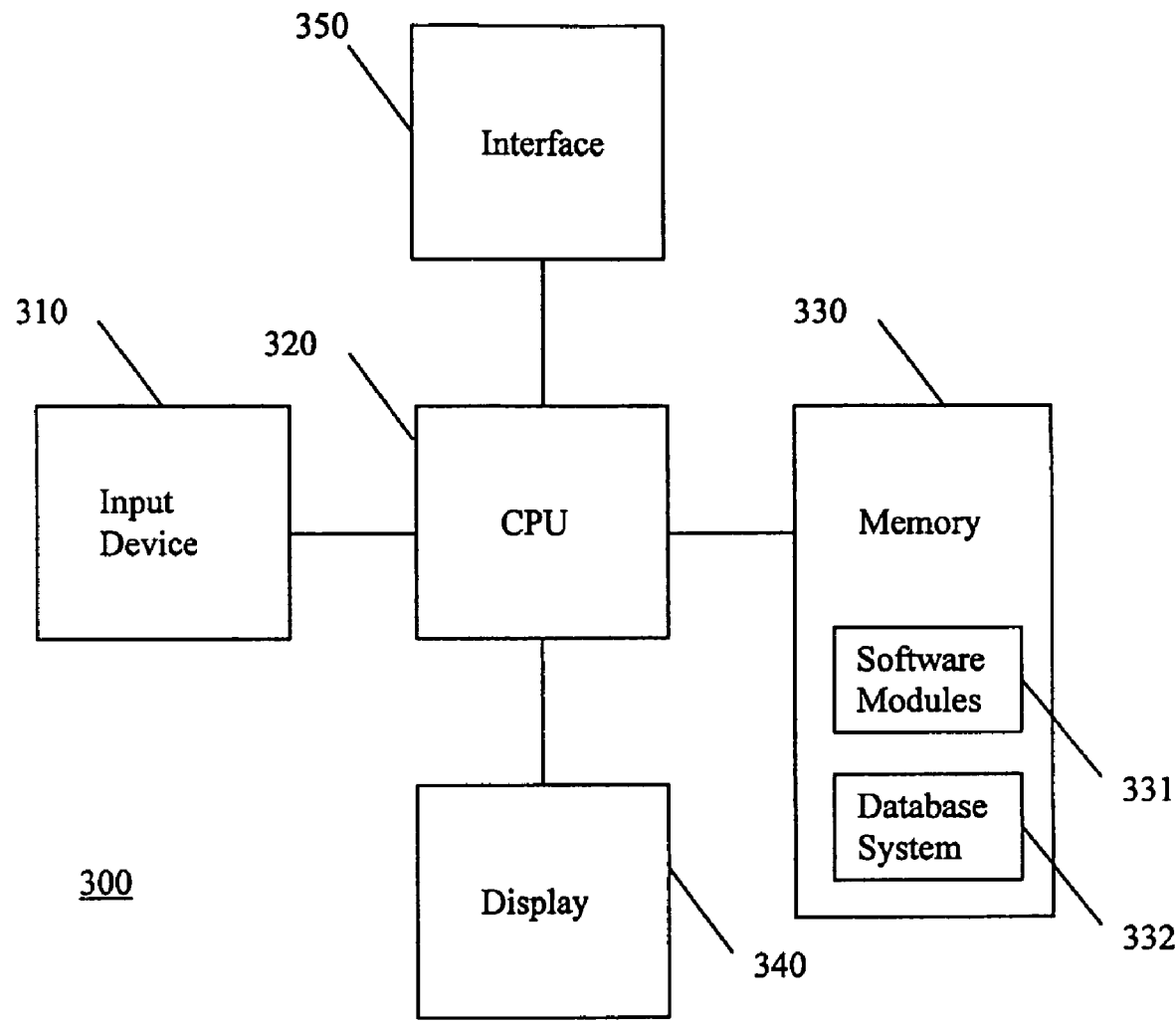
FIG. 3 is a block diagram illustrating a data processing system adapted to implement an embodiment of the invention.

FIG. 3 is a block diagram illustrating a data processing system 300 adapted to implement an embodiment of the invention. The data processing system 300 is suitable for operation as a network node (e.g., A.5) in a communications network (e.g., 200) such as an ATM network. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection including an ATM network connection. The input device 310 may include a keyboard, a mouse, a trackball, or a similar device. And, the display 340 may include a computer screen, terminal device, or a hard-copy producing output device such as a printer or plotter. The data processing system 300 is adapted for communicating with other data processing systems (not shown) over a network 200 via the interface device 350. The data processing system 300 may include a database system 332 for storing and accessing network topology and programming information. The database system 332 may include a database management system ("DBMS") and a database and is stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300.

Referring again to FIG. 2, the present invention provides a method to ensure that there are no situations where two neighboring nodes having free resources (e.g., D and A.5) do not utilize these resources to synchronize with each other. By ensuring this, network synchronization can be improved. In general, the present invention employs three rules or mechanisms to improve node synchronization as follow:

1. Each node (e.g., A.5) shall deterministically select which neighboring nodes (e.g., A.4, B, C, D, G, H) shall be assigned neighbor synchronization resources (e.g., 210) when those resources become available. This selection is rule based.
2. Each node (e.g., A.5) shall indicate in a message transmitted over the network 200 (e.g., via the Hello protocol, via a Database Summary packet ("DBSP", etc.) prior to neighbor synchronization, that it has allocated neighbor synchronization resources (e.g., 210) to one or more links (e.g., 230) in order to notify its neighboring nodes that they have been selected for synchronization. This message may take the form of or include a "Synch Resource Assignment" flag.
3. Upon receipt of a message indicating neighbor synchronization selection, each node shall systematically select neighbors to synchronize with to ensure that all synchronization resources are optimally used. If required, each node shall move or re-assign synchronization resources to available links, as needed, to speed-up the synchronization process.

Thus, according to the present invention, the utilization of synchronization resources of a given first node is maximized by reassigning unused resources to another neighboring node if that neighboring node has already selected the first node for synchronization and has signalled the first node of this intention via a transmitted message (e.g., a DBSP). In conjunction with re-assignment, the arbitrary nature of neighboring node selection is replaced by a deterministic approach, which results in more mutual selections of neighboring nodes. The expression "mutual selection" is used herein to refer to the case where two neighboring nodes have selected each other for synchronization and have signalled this intention to one another. Advantageously, the combination of resource reassignment and deterministic selection results in faster overall synchronization of neighboring nodes in a network.

After a network failure or re-start, nodes deterministically assign synchronization resources to neighboring nodes according to a rule that all nodes must follow. The rule relies on each node having a unique value associated with it. For example, the unique value could be an Internet Protocol ("IP") or ATM address, a node ID, or a unique value used exclusively for neighbor synchronization which is advertised to the network through, for example, the Hello protocol. The rule functions to select and assign synchronization resources to the next available neighbor node with the highest (or lowest) unique value. The term "available" is used herein to mean unselected, unsynchronized, and having two-way communications established with the present node, for example, via the Hello protocol.

Assigning resources by this rule will allow the nodes with the highest (or lowest) unique values (and their neighbors) to begin synchronizing immediately. Other nodes, however, may not be using their synchronization resources even after following this rule as they would need to wait for the higher (or lower) value nodes to finish. These nodes may still have other neighbors they could synchronize with. As such, these nodes may use the Synch Resource Assignment flag to determine if there is an opportunity to jump-start further synchronizations. This is accomplished by allowing nodes to re-assign their synchronization resources to other neighbors if those neighbors indicate they are available for synchronization.

Figure 4:
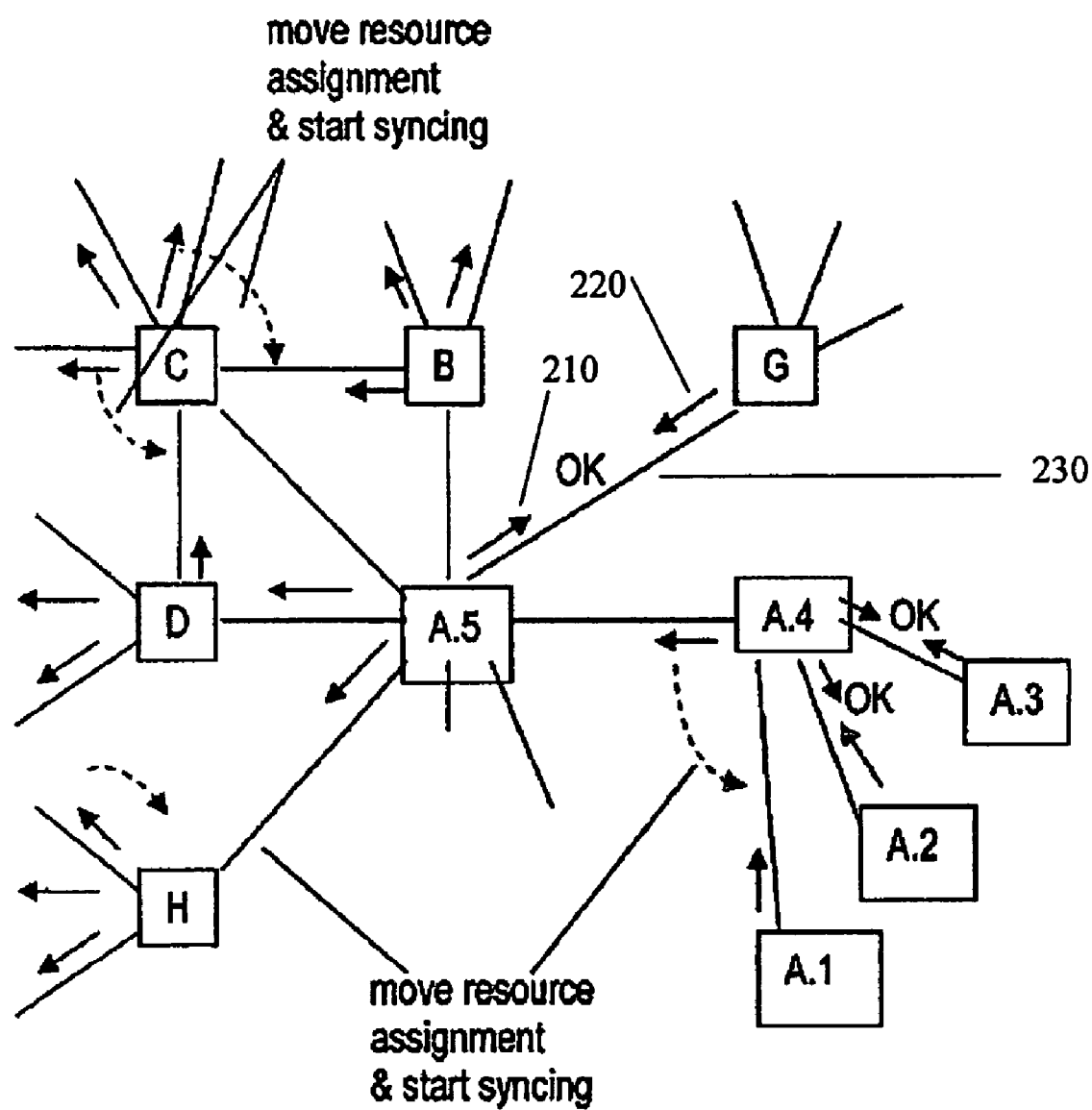
FIG. 4 is a block diagram illustrating an improved synchronization method for neighboring nodes in a communications network in accordance with an embodiment of the invention.

The above described method may be illustrated graphically. FIG. 4 is a block diagram illustrating an improved synchronization method for neighboring nodes (e.g., A.1, A.4, A.5, etc.) in a communications network 200 in accordance with an embodiment of the invention. In this example, each node has only enough synchronization resources available to synchronize with three other neighboring nodes simultaneously. This is illustrated in FIG. 4 by three arrows directed along selected links 230 emanating from nodes B, C, D, H, A.5, and A.4. The selection rule (in this example) is to select the three available neighboring nodes with the highest node ID value, where node A.1 has the lowest node ID value of "A.1" (i.e., A. 1<A.2<A.3<A.4<A.5<B<C<D<G<H). This rule causes node A.5 to assign neighbor synchronization resources to neighboring nodes D, G, and H (i.e., D, G, and H are higher node ID values than B and C). Similarly, node A.4 assigns neighbor synchronization resources to neighboring nodes A.2, A.3 and A.5 (i.e., A.2, A.3, and A.5 are higher node ID values than A.1). From this initial selection, some nodes can begin synchronizing immediately (e.g., A.5 and G, A.4 and A.3, A.4 and A.2). The use of this highest node ID value rule causes nodes with the highest node ID values to synchronize first. Advantageously, this property can be used to favour the core of a network, with respect to node synchronization order, either by assigning node IDs accordingly or by assigning other synchronization values to nodes and using these values in the selection rule to bias which nodes preferentially complete synchronization first.

Referring again to FIG. 4, note that node A.4 initially selects node A.5. to synchronize with. Node A.4's synchronization resources will be wasted if they were not used immediately. They will not be used immediately because node A.5 has not selected node A.4 for synchronization. Node A.4 notices, however, that its neighbor A.1 has advertised that it has assigned neighbor synchronization resources to A.4. Therefore, node A.4 can reassign its neighbor synchronization resources from node A.5 to synchronize the node A.1 first. When node A.4 is finished synchronizing with node A.1, it will again select node A.5 for synchronization, and will continue to favour node A.5 in its selection process until it succeeds in synchronizing with node A.5. This repeatability is an advantageous property because it ensures that there will be more mutual selections between neighboring nodes than if an arbitrary selection process were followed.

Other selection rules may be possible, such as including a new "Synchronization Priority TLV" in the Hello protocol to indicate relative priorities of nodes. However, selecting the neighbors with the highest (or lowest) node ID (or router ID) value is preferred because of simplicity of implementation and wide applicability to many protocols.

Thus, the present invention facilitates improved network recovery and network start-up through faster synchronization of neighboring nodes. In addition, the present invention has wide applicability as it may be implemented in several dynamic routing protocols (e.g., PNNI, OSPF, and ISIS) in which neighboring nodes must synchronize themselves.

According to one embodiment, the present invention may be implemented in networks operating under a version of the PNNI Specification modified as described in the following. It should be noted that the invention may also be implemented in networks operating under OSPF and Intermediate System-to-Intermediate System ("IS-IS") specifications.

With respect to database synchronization (i.e., Section 5.7 of the PNNI Specification), according to this one embodiment, when a node (e.g., A5 in FIG. 4) first learns about the existence of a neighboring peer node (residing in the same peer group) (e.g., G in FIG. 4), it is assigned database synchronization resources as they become available. These synchronization resources are needed to perform a database synchronization and when they are assigned to a neighboring peer state machine, the state machine initiates a database exchange process in order to synchronize the topology databases of the neighboring peers.

The database exchange process involves the exchange of a sequence of DBSPs, which contains the identifying information of all PNNI Topology State Elements ("PTSEs") in a node's topology database. DBSPs are exchanged using a lock-step mechanism, whereby one side sends a DBSP and the other side responds (implicitly acknowledging the received packet) with its own DBSP. At most one outstanding packet between the two neighboring peers is allowed at any one time.

When a node receives a DBSP from a neighboring peer, it examines its topology database for the presence of each PTSE described in the packet. If the PTSE is not found in the topology database or if the neighboring peer has a more recent version of the PTSE, then the node must request the PTSE from this neighboring peer, or optionally from another neighboring peer whose database summary indicates that it has the most recent version of the PTSE.

For lowest-level neighboring peers, there may be multiple parallel physical links and/or Virtual Path Connections ("VPCs") between them. Each physical link and/or VPC between the two neighboring peers will run a separate Hello protocol state machine. However, for the purposes of database synchronization and flooding, only one conversation is held between the neighboring peers. This conversation is described by the neighboring peer state machine and the neighboring peer data structure, which includes the information required to maintain database synchronization and flooding to the neighboring peer. Whenever a link reaches the Hello state "2-WayInside", the event "AddPort" is triggered in the corresponding neighboring peer state machine. Similarly, when a link falls out of the Hello state 2-WayInside, the event "DropPort" is triggered in the corresponding neighboring peer state machine. The database exchange process commences when the event AddPort is first triggered, after the first link between the two neighboring peers comes up. When the DropPort event for the last link between the neighboring peers occurs, the neighboring peer state machine will internally generate the "DropPortLast" event causing all state information for the neighboring peer to be cleared.

When PNNI Topology State Packets ("PTSPs"), PTSE "Acknowledgment" packets, DBSPs, or PTSE "Request" packets are transmitted, any of the links between the neighboring peers that is in the Hello state 2-WayInside may be used. Successive packets may be sent on different links, without any harmful effects on the distribution and maintenance of PNNI routing information. Links between lowest-level neighboring peers may only be advertised in PTSEs when the neighboring peer state machine is in the "Full" state. For the case of neighboring lowest-level peers connected by physical links and VPCs, changes into or out of the Full state will cause new instances of one or more of this node's PTSEs to be originated or flushed.

Between neighboring peer logical group nodes, only the Switched Virtual Channel Connection ("SVCC")-based Routing Control Channel ("RCC") is used for the exchange of PNNI routing packets. Similarly to the case of lowest-level neighboring peers, the neighboring peer state machine is coupled to the Hello state machine of the RCC. Note the Hello states of the horizontal links between the Logical Group Nodes ("LGNs") do not affect the neighboring peer state. When the Hello state of the RCC reaches 2-WayInside, the event AddPort is triggered in the neighboring peer state machine and the database exchange process commences. When the Hello state of the RCC falls out of the state 2-WayInside, the event DropPort is triggered in the neighboring peer state machine, causing it to transition from Full state to "NPDown" state.

In the case where neighbors communicate via an SVCC-based RCC, the neighboring peer state machine does not directly affect origination of horizontal link PTSEs. Rather, it affects the origination of horizontal link PTSEs indirectly through the "Horizontal Link" Hello protocol. In addition, when first originating a PTSE for a given link, the associated LGN Hello machine must be in 2-WayInside and the peer data structure must be in Full state.

With respect to the neighboring peer data structure (i.e., Section 5.7.1 of the PNNI Specification), each node has a single neighboring peer data structure for each neighboring peer node regardless of the number of links between those nodes. Neighboring peer conversations in states other than NPDown are called adjacencies. The neighboring peer data structure contains all information pertinent to a forming or formed adjacency between two neighboring peers. Neighbor nodes belonging to different peer groups will not form an adjacency. The neighboring peer data structure includes the following information:

"State": The state of the neighboring peer Finite State Machine ("FSM"). This is described in more detail below.

"Remote Node ID": The node ID used to identify the neighboring peer node.

"Port ID List": The Port ID List is only used in the case of lowest-level neighboring peers, which are connected by physical links and/or VPCs. The Port ID List is a list of those links to the neighboring peer that are in the state 2-WayInside. When PTSPs, PTSE acknowledgment packets, DBSPs, or PTSE request packets are transmitted or retransmitted to the neighboring peer, any of the links specified in this list may be used.

"DS Sequence Number": An unsigned 32-bit number identifying individual DBSPs. When the "Negotiating" state is first entered, the Database Summary ("DS") sequence number should be set to a value not previously seen by the neighboring peer but not too large to safely avoid sequence number wrapping. One possible scheme is to use the lower 24 bits of the machine's time of day counter. The DS sequence number is then incremented by the master with each new DBSP sent. The slave's DS sequence number indicates the last packet received from the master.

"Peer Retransmission List": The list of PTSEs that have been flooded but not acknowledged by the neighboring peer. These will be retransmitted periodically until they are acknowledged, or until the neighboring peer state machine is taken down. Associated with each entry in this list is a "PTSE Retransmission Timer". This is an interval timer that fires after "PTSERetransmissionInterval" seconds. The timer is stopped when an acknowledgment is received that corresponds to that PTSE.

"PTSERetransmissionInterval": Each unacknowledged PTSE is retransmitted every PTSERetransmissionInterval seconds.

"Peer Delayed Acks List": The list of PTSEs for which delayed acknowledgments will be sent to a neighboring peer. Every "PeerDelayedAckInterval" seconds acknowledgment packets are transmitted to the neighboring peer that contain the PTSE identifying information for all entries on the Peer Delayed Acks List, and the list is cleared.

"PeerDelayedAckInterval": This is the time interval between consecutive checks of the Peer Delayed Acks List.

"Peer Delayed Ack Timer": When this timer expires, any unacknowledged PTSEs in the Peer Delayed Acks List are bundled in an acknowledgment packet and sent to the neighboring peer.

"PTSE Request List": The list of PTSEs that need to be requested in order to synchronize the two neighboring peers' topology databases. This list is created as DBSPs are received. PTSE Request packets are used to request each PTSE on this list from this neighboring peer, or optionally from any other neighboring peer known to possess the missing PTSE. The list is depleted as appropriate PTSEs are received.

"DSRxmtInterval": The amount of time, in seconds, a node waits before it sends the previous DBSP again.

"DS Rxmt Timer": An interval timer that fires after DSRxmtInterval seconds. The timer is stopped when the node receives a correct DBSP.

"RequestRxmtInterval": The amount of time, in seconds, before a node sends a new PTSE Request Packet requesting PTSEs of the last PTSE Request Packet that have not been received yet.

"Request Rxmt Timer": An interval timer that fires after RequestRxmtInterval seconds. The timer is stopped when all of the PTSEs requested in the last PTSE Request Packet have been received.

"Last Received Database Summary Packet's Identifying Information": The DBSP packet flags (including the "Initialize", "More", "Master", and reserved bits) and DS sequence number contained in the last DBSP received from the neighboring peer. This information is used to determine whether the next DBSP received from the neighboring peer is a duplicate.

According to this one embodiment of the invention, the neighboring peer data structure includes the following additional information:

"Synch Resources Assigned Status": The local synchronization resources assigned status can be either assigned or unassigned. It is used to indicate to its neighbor whether database synchronization resources have been made available to this neighbor peer FSM. If the synch resources are assigned, then the "Synch Resources Assigned" bit is set to one in transmitted DBSPs. If there are no synch resources assigned, then the Synch Resources Assigned bit is cleared in transmitted DBSPs.

"Database Synch Resources": Database ("DB") synchronization (or "synch") resources are those resources needed to complete the database synchronization process with a neighbor peer. If a logical node is not capable of performing concurrent database synchronizations with all neighbor peers at one time, then database synchronization resources are limited to only allow a maximum number of neighbors to database synchronize at any one time. A database synchronization resource is assigned to a neighbor peer FSM in a deterministic fashion when they become free (see above). The exact contents of the DB synch resources is implementation specific, however, they may contain items such as PTSE request list resources, or Database Summary resources, master/slave relationship, etc. For reference, when the two neighboring peers are exchanging databases, they form a master/slave relationship. This relationship is relevant only for initial topology database exchange. The master sends the first DBSP and chooses the initial DS Sequence Number. Retransmissions of DBSPs are controlled by the master. The slave can only respond to the master's DBSPs. The master/slave relationship is determined in the "Negotiating" state.

"Synch Resources In Use Interval": The amount of time, in seconds, before a neighbor peer FSM must re-evaluate which neighbor is going to use the synch resources currently assigned to this neighbor peer FSM.

"Synch Resources In Use Timer": An interval timer that fires after Synch Resources In Use Interval seconds. The timer is stopped when entering the "Exchanging" or "NPDown" states.

Figure 5:
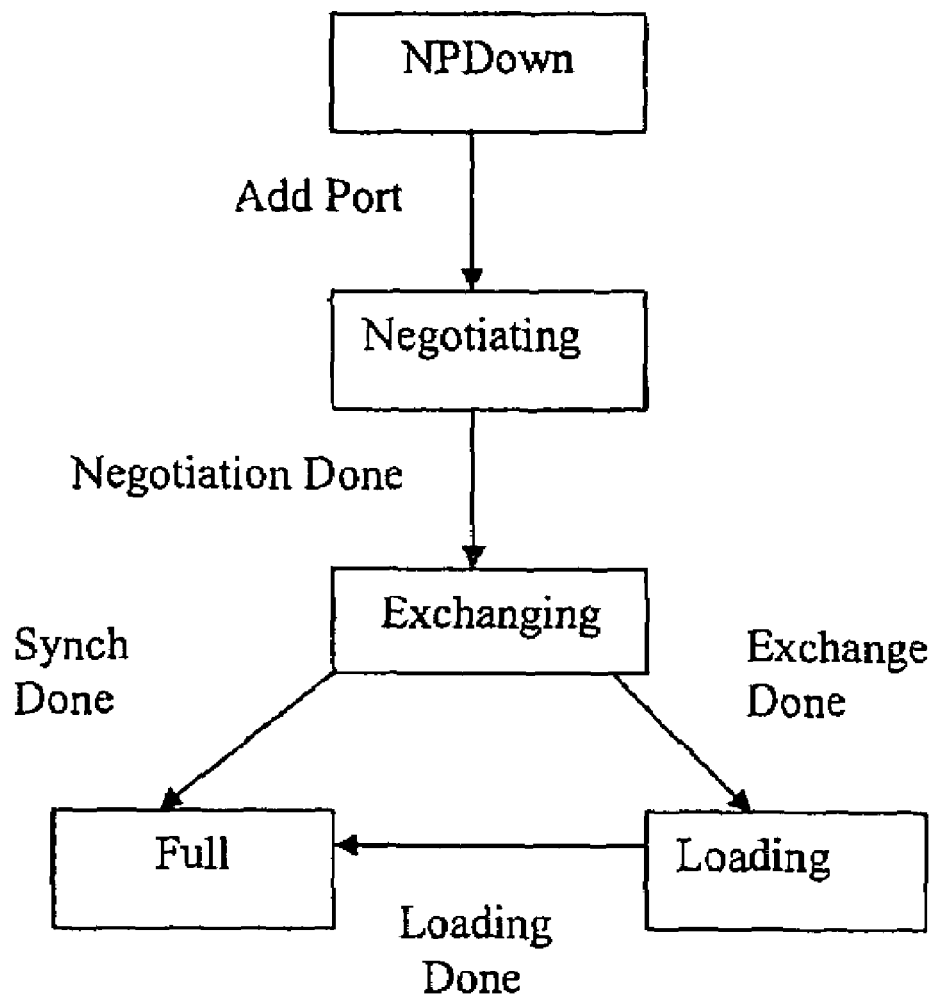
FIG. 5 is a flow chart illustrating possible state changes for a neighboring peer state machine; and, FIG. 6 is a flow chart illustrating operations of software modules within the memory of a data processing system for selecting a neighboring node to synchronize network topology database information with a network node from among a plurality of neighboring nodes coupled to the network node in a network, in accordance with an embodiment of the invention.

With respect to neighoring peer states (i.e., Section 5.7.2 of the PNNI Specification), a neighboring peer state machine is used to describe the state of database synchronization and flooding ongoing with the neighboring peer. FIG. 5 is a flow chart illustrating possible state changes for a neighboring peer state machine. The arcs in the chart are labeled with the events that cause each state change. The events are described below. The states include the following:

"NPDown": The initial state of a neighboring peer FSM. This state indicates that there are no active links (i.e., in Hello state 2-WayInside) to the neighboring peer. In this state, there are no adjacencies associated with the neighboring peer.

"Negotiating": The first step in creating an adjacency between the two neighboring peers. The goal of this step is to decide which node is the master, and to decide upon the initial DS sequence number.

"Exchanging": In this state the node describes its topology database by sending DBSPs to the neighboring peer. Following as a result of processing DBSPs, required PTSEs can be requested.

"Loading": In this state, a full sequence of DBSPs has been exchanged with the neighboring peer, and the required PTSEs are requested and at least one has not yet been received.

"Full": In this state, this node has received all PTSEs known to be available from the neighboring peer. Links to the neighboring peer can now be advertised in PTSEs.

In addition to the state transitions shown in FIG. 5, the following additional state transitions should be noted: the event "DSMismatch" forces the Negotiating state; the event "BadPTSERequest" forces the Negotiating state; the event "DropPort" causes no state change; and, the event "DropPortLast" forces the NPDown state.

With respect to events causing neighboring peer state changes (i.e., Section 5.7.3 of the PNNI Specification), state changes can be brought about by a number of events. These events are triggered by procedures associated with database synchronization between the two neighboring peers, or by actions of the Hello state machines for the associated links. The events are shown in the labels of the arcs in FIG. 5. A detailed description of the state changes and actions taken after an event occurs is provided below. The events are defined as follows:

"AddPort": A Hello state machine for a link to the neighboring peer has reached 2-WayInside state.

"NegotiationDone": The Master/Slave relationship has been negotiated, and the initial DS sequence number has been agreed upon.

"ExchangeDone": The neighboring peer's last DBSP has been received, this node's last DBSP has been sent, and the PTSE request list is not empty. The node now knows which PTSEs need to he requested.

"SynchDone": The neighboring peer's last DBSP has been received, this node's last DBSP has been sent, and the PTSE request list is empty.

"LoadingDone": The last PTSE on the PTSE Request List has been received.

"DSMismatch": A DBSP has been received that: (a) has an unexpected DS sequence number, or (b) unexpectedly has the Initialize bit set, or (c) has an unexpected setting of the Master bit. Any of these conditions indicates that an error has occurred in database synchronization.

"BadPTSERequest": A PTSE Request has been received for a PTSE not contained in the database, or a received PTSE is less recent than the instance on the PTSE Request List. This indicates an error in database synchronization.

"DropPort": A Hello state machine for a link to the neighboring peer has exited the 2-WayInside state.

"DropPortLast": In processing a DropPort event, it was determined that all ports to this neighbor have been dropped.

According to this one embodiment of the invention, events causing neighboring peer state changes include the following additional events:

"Assign Synch Resources": Local database synchronization resources have been assigned to this neighbor peer FSM and this node is now ready to start synchronizing with its neighbor.

"Relinquish Synch Resources": Local database synchronization resources used by this neighbor peer FSM must now be used by a higher priority neighbor peer FSM.

"Synch Resources In Use Timer Expired": The Synch Resources In Use timer has expired and this neighbor peer FSM has not started synchronizing with its neighbor yet, since it is in the Negotiating state. This neighbor peer FSM must determine if the synchronization resources currently assigned to it should be re-assigned to another neighbor peer FSM, or reused by this neighbor again.

With respect to the neighboring peer state machine (i.e., Section 5.7.4 of the PNNI Specification), the finite state machine ("FSM") is represented by a two dimensional table (see below) having states across the top of the table and events down the left side. Each pairing of event and state cross at a "cell" in the table. The cell shows what state transition should occur and the action to take. For example, for the event and state pair of "AddPort" and "NPDown" the cell reads "Ds1, Negotiating". "Negotiating" is the new state and "Ds1" is the action to be taken. The actions are described below the following table. According to this one embodiment of the invention, the neighboring peer state machine includes the following additional events and states (shown as bold italic in the table):

information is still available. It then declares itself master (sets the Master bit to one), and starts sending DBSPs, with the Initialize, More, and Master bits set. No PTSE Summaries are included in this packet. This DBSP is retransmitted at intervals of DSRxmtInterval until the next state is entered. In addition, in accordance with this one embodiment, the procedures described below (i.e., with respect to assigning database synch resources to neighbor peer FSMs) are executed.

Ds2: The node must begin sending a summary of the contents of its topology database to the neighboring peer in DBSPs. The topology database consists of the PTSEs either originated or received by this node, at the level of this node's peer group or at a higher level. Each DBSP has a DS sequence number, and is implicitly acknowledged. Only one DBSP is allowed outstanding at any one

Neighboring Peer FSM

| | States | | | | |
|---|---|---|---|---|---|
| Events | NPDown | Negotiating | Exchanging | Loading | Full |
| Add Port | Ds1 Negotiating | Ds7 Negotiating | Ds7 Exchanging | Ds7 Loading | Ds8 Full |
| *Assign Synch Resources* | *FSM_ERR* | *Ds15 Negotiating* | *FSM_ERR* | *FSM_ERR* | *FSM_ERR* |
| *Relinquish Synch Resources* | *FSM_ERR* | *FSM_ERR Negotiating* | *FSM_ERR* | *FSM_ERR* | *FSM_ERR* |
| Negotiation Done | FSM_ERR | Ds2 Exchanging | FSM_ERR | FSM_ERR | FSM_ERR |
| Exchange Done | FSM_ERR | FSM_ERR | Ds3 Loading | FSM_ERR | FSM_ERR |
| SynchDone | FSM_ERR | FSM_ERR | Ds4 Full | FSM_ERR | FSM_ERR |
| Loading Done | FSM_ERR | FSM_ERR | FSM_ERR | Ds4 Full | FSM_ERR |
| DS Mismatch | FSM_ERR | FSM_ERR | Ds5 Negotiating | Ds5 Negotiating | Ds6 Negotiating |
| BadPTSE Request | FSM_ERR | FSM_ERR | Ds5 Negotiating | Ds5 Negotiating | Ds6 Negotiating |
| DropPort | FSM_ERR | Ds9 Negotiating | Ds9 Exchanging | Ds7 Loading | Ds9 Full |
| DropPort Last | FSM_ERR | Ds10 NPDown | Ds10 NPDown | Ds10 NPDown | Ds10 NPDown |
| *Synch Resource In Use Timer Expired* | *FSM_ERR* | *Ds17 Negotiating* | *FSM_ERR* | *FSM_ERR* | *FSM_ERR* |
| DS Rxmt Timer Expired | FSM_ERR | Ds11 Negotiating | Ds11 Exchanging | FSM_ERR | FSM_ERR |
| Request Rxmt Timer Expired | FSM_ERR | FSM_ERR | Ds12 Exchanging | Ds7 Loading | FSM_ERR |
| PTSE Rxmt Timer Expired (1) | FSM_ERR | FSM_ERR | Ds13 Exchanging | Ds13 Loading | Ds13 Full |
| Peer Delayed Ack Timer Expired | FSM_ERR | FSM_ERR | Ds14 Exchanging | Ds14 Loading | Ds14 Full |

Noting that the acronym "FSM_ERR" represents an internal implementation error, the actions in the above table are as follows:

Ds0: Do nothing.

Ds1: For the case of lowest-level nodes, which are connected by physical links and/or VPCs, the port ID is added to the Port ID List in the neighboring peer data structure. Upon entering this state, if this is the first time that an adjacency has been attempted, the DS sequence number should be assigned some unique value (like the time of day clock). Otherwise, the node increments the DS sequence number saved from the previous time this adjacency was active for this neighboring peer, if that time. In addition, in accordance with this one embodiment, the Synch Resources In Use Timer is stopped if it was running.

Ds3: Stop the DS Rxmt Timer if not previously stopped. Start (or continue) sending PTSE Request packets to this neighboring peer and/or optionally to other neighboring peers. Each PTSE Request packet asks for some of the neighboring peer's more recent PTSEs (which were discovered but not yet received in the Exchanging state). These PTSEs are listed in the PTSE Request list in the neighboring peer data structure.

Ds4: Stop the DS Rxmt Timer if not previously stopped. The databases are now synchronized. For the case of lowest-level neighbor nodes, all links to the neighbor must now be advertised in PTSEs. In addition, in accordance with this one embodiment, the procedures described below (i.e., with respect to assigning database synch resources to neighbor peer FSMs) are executed.

Ds5: The Peer Delayed Ack Timer, DS Rxmt Timer, and Request Rxmt Timer are stopped if not previously stopped. The Peer Retransmission List, Peer Delayed Ack List, PTSE Request List and all related timers are cleared. The exchange of database summaries must start over again. The node increments the DS sequence number for this neighboring peer, declares itself master (sets the Master bit to one), and starts sending DBSPs with the Initialize, More, and Master bits set. No PTSE summaries are included in this packet. The DS Rxmt Timer is started and the DBSP is retransmitted each DSRxmtInterval time. In addition, in accordance with this one embodiment, the procedures described below (i.e., with respect to assigning database synch resources to neighbor peer FSMs) are executed.

Ds6: Same as Ds5, except if there are any PTSEs advertising links to that neighbor, those PTSEs must he modified to remove the links. Such PTSEs must be re-originated or if necessary, flushed. In addition, in accordance with this one embodiment, the procedures described below (i.e., with respect to assigning database synch resources to neighbor peer FSMs) are executed.

Ds7: For the case of lowest-level neighboring peers, which are connected by physical links and/or VPCs, the port ID is added to the Port ID list in the neighboring peer data structure.

Ds8: Same as Ds7 with the additional requirement that this action will cause a link to the neighboring peer to be added, causing a new instance of a PTSE to be originated.

Ds9: The link is removed from the Port ID list in the corresponding neighboring peer data structure. The action will cause a link to the neighboring peer to be removed. In the Full state if there is a PTSE advertising that link, a new instance of the affected PTSE must be originated. If this was the last active link to this neighbor, generate the DropPortLast event.

Ds10: The Peer Delayed Ack Timer, DS Rxmt Timer, Synch Resources In Use, and Request Rxmt Timer are stopped, if not previously stopped. The Peer Retransmission List, Peer Delayed Acks List, PTSE Request List and all related timers are cleared. In addition, in accordance with this one embodiment, the Synch Resources In Use Timer is stopped if not previously stopped.

Ds11: Send the previous Database Summary packet to the neighbor and restart the DS Rxmt timer.

Ds12: Send a PTSE Request packet containing one or more entries from the PTSE Request List to this neighboring peer, and/or optionally to any other neighboring peers and restart the corresponding Request Rxmt timer.

Ds13: Those PTSEs that were last transmitted more than PTSE Retransmission Interval seconds ago and not yet acknowledged are encapsulated in a PTSP and transmitted to the neighboring peer. All related PTSE Retransmission Timers are restarted.

Ds14: Send a PTSE Acknowledgment packet containing all PTSE identifying information items from the Peer Delayed Acks List to the neighboring peer. Acknowledged PTSEs are deleted from the Peer Delayed Acks List.

Ds15: In accordance with this one embodiment, send a PTSE Acknowledgment packet containing all PTSE identifying information items from the Peer Delayed Acks List to the neighboring peer. Acknowledged PTSEs are deleted from the Peer Delayed Acks List.

Ds16: In accordance with this one embodiment, stop the Synch Resources In Use Timer if it was running. Clear the Synch Resources Assigned bit in the DBSPs transmitted by this node and immediately transmit a DBSP packet.

Ds17: In accordance with this one embodiment, execute the procedures described below (i.e., with respect to assigning database synch resources to neighbor peer FSMs).

With respect to sending DBSPs (i.e., Section 5.7.5 of the PNNI Specification), the following describes how DBSPs are sent to a neighboring peer. Only one DBSP is allowed outstanding at any one time. The sending of DBSPs depends on the neighboring peer state. In the Negotiating state, the node sends empty DBSPs, with the Initialize, More, Master bits set. According to this one embodiment of the invention, the Synch Resources Assigned bit is set based on the rules defined below (i.e., with respect to assigning database synch resources to neighbor peer FSMs). When sending such DBSPs, the DS Rxmt Timer must be restarted. These packets are retransmitted every DSRxmtInterval seconds, when the DS Rxmt Timer fires.

In the Exchanging state, including when sending the DBSP in response to the event NegotiationDone, the DBSPs contain summaries of the topology state information contained in the node's database. In the case of Logical Group Nodes, those portions of the topology database that were originated or received at the level of the Logical Group Node or at higher levels are included in the database summary (lower level PTSEs may belong to the switching system's topology database for one or more of its incarnations as a lower level node, but do not belong to the logical group node's topology database). Any portions of the topology database that were originated at the level of the Logical Group Node and with an Originating Peer Group ID different from the Peer Group ID of the Logical Group Node shall not be included in the database summary. The PTSP and PTSE header information of each PTSE that is to be included in the database summary is listed in one of the node's DBSPs. PTSEs for which new instances are received after the Exchanging state has been entered need not be included in any DBSP, since they will be handled by the normal flooding procedures. It is recommended but not required that each PTSE be included at most once in the entire sequence of DBSPs sent to the neighboring peer.

In the Exchanging state, the determination of when to send a DBSP depends on whether the node is master or slave. When a new DBSP is to be sent, the packet's DS sequence number is set as described below and a new set of PTSEs from the node's topology database is described. Each item is considered to have been received by the neighboring peer when the DBSP in which it was included is acknowledged. Note that the More bit is set asymmetrically, with different rules used depending on whether the node is master or slave:

Master: DBSPs are sent when either (i) the slave acknowledges the previous DBSP by echoing the DS sequence number, or (ii) DSRxmtInterval seconds elapse without an acknowledgment, in which case the previous DBSP is retransmitted. The DS Rxmt Timer must be restarted whenever a DBSP is transmitted. If the node has already sent its entire sequence of DBSPs, then the More bit must be set to zero. If this packet includes the last portions of the database summary to be sent to the slave, then the More bit may optionally be set to zero.

Slave: DBSPs are sent only in response to DBSPs received from the master. If the packet received from the master is new, a new DBSP is sent; otherwise the previous DBSP is retransmitted. If the node has already sent its entire sequence of DBSPs (i.e., the contents of this DBSP are empty), then the more bit must be set to zero. In states Loading and Full the slave must resend its last DBSP in response to duplicate DBSPs received from the master. Note that in the Loading or Full state, the last packet that the slave had sent must have been empty, with the Initialize, More, and Master hits set to zero and with the same DS sequence number as in the current neighboring peer data structure.

With respect to receiving DBSPs (i.e., Section 5.7.6 of the PNNI Specification), the following describes processing of a received DBSP. The incoming DBSP is associated with a neighboring peer by the interface over which it was received. Each DBSP has a DS sequence number, and is implicitly acknowledged. The further processing of the DBSP depends on the state of the neighboring peer data structure associated with the Remote Node ID.

If a DBSP is accepted, the following packet fields are saved in the corresponding neighboring peer data structure as the "Last Received Database Summary Packet's Identifying Information": the DBSP flags (including the Initialize, More, Master, and reserved bits), and the DS sequence number. If these fields are set identically in two consecutive DBSPs received from the neighboring peer, the second DBSP is considered to be a "duplicate" in the processing described in the following.

If the neighboring peer state is NPDown, the packet must be ignored.

Otherwise, if the state is:

Negotiating: If the received packet matches one of the following cases, and if according to this one embodiment of the invention there are synch resources assigned to this neighboring peer state machine as outlined below (i.e., with respect to assigning database synch resources to neighbor Peer FSMs), then the neighboring peer slate machine must be executed with the event NegotiationDone (causing the state to transition to Exchanging) and the packet must be accepted as next in sequence and processed further. Otherwise, the packet must be ignored.

The Initialize, More and Master bits are one, the contents of the packet are empty, and the neighboring peer's Node ID is larger than this node's own node ID. In this case this node is now a Slave. Upon generating the event NegotiationDone, the slave must take the following actions:

Stop the DS Rxmt Timer,

Set the Master bit to zero (indicating slave), set the Initialize bit to zero, set the DS sequence number to that specified by the master, and send a DBSP to the master including the first portion of this node's database summary.

The Initialize and Master bits are zero, the packet's DS sequence number equals the node's own DS sequence number (indicating acknowledgment), and the neighboring peer's node ID is smaller than the node's own node ID. In this case this node is Master. Upon generating the event NegotiationDone, the master must take the following actions (the last two actions need not be taken in this order):

Stop the DS Rxmt Timer,

Process the contents of the received DBSP (see the last paragraph describing actions to be taken under the Exchanging state below), Increment the DS sequence number by one, set the Initialize bit to zero, send a DBSP to the slave including the first portion of this node's database summary and restart the DS Rxmt Timer.

Exchanging: Execute the following steps in order:

If the node is master and the received DBSP is a duplicate, stop processing the packet.

If the node is slave and the received DBSP is a duplicate, respond by retransmitting the last DBSP sent to the master and stop processing the received DBSP.

If the state of the Master bit is inconsistent with the master/slave state of the connection, generate the event DSMismatch and stop processing the packet.

If the Initialize bit is set, generate the event DSMismatch and stop processing the packet.

If the node is master and the packet's DS sequence number equals the node's own DS sequence number (this packet is the next in sequence), the packet must be accepted and processed as follows (the last two actions need not be taken in this order):

Stop the DS Rxmt Timer,

Process the contents of the received DBSP (see below),

In the following order:

A) Increment the DS sequence number by one,

B) If the node has already sent its entire sequence of DBSPs (i.e., the previous DBSP that the node sent had the More bit set to zero), and the received packet also has the More bit set to zero, generate the event ExchangeDone if the PTSE Request List is not empty, or the event SynchDone if the PTSE Request List is empty.

C) Otherwise, send a new DBSP to the slave and restart the DS Rxmt Timer.

If the node is slave and the packet's DS sequence number is one more than the node's own DS sequence number (this packet is the next in sequence), the packet must be accepted and processed as follows (in no particular order):

Process the contents of the received DBSP (see below),

In the following order:

D) Set the DS sequence number to the DS sequence number appearing in the received packet, E) Send a DBSP to the master, F) If the received packet has the More bit set to zero, and the just transmitted DBSP also had its More bit set to zero (i.e., the contents of the just transmitted DBSP were empty), then generate the event ExchangeDone if the PTSE Request List is not empty, or the event SynchDone if the PTSE Request List is empty.

Else, generate the event DSMismatch and stop processing the packet.

Processing the contents of a received DBSP:

When the node accepts a received DBSP as the next in sequence, the contents of the most recently transmitted DBSP are acknowledged as having been received and the contents of the received DBSP are processed as follows.

For each PTSE listed, the node looks up the PTSE in its database to see whether it also has an instance of the PTSE. If it does not, or if the database copy is less recent, one of the following actions is taken:

If the listed PTSE is one of this node's self-originated PTSEs, the node must either:

Re-originate a newer instance of the PTSE with a larger sequence number, if the node has a valid instance of the PTSE, or Flush the PTSE from the routing domain after installing it in the topology database with the remaining lifetime set to "ExpiredAge".

Otherwise, if the listed PTSE has PTSE Remaining Lifetime ExpiredAge, the PTSP and PTSE header contents in the PTSE summary must be accepted as a new or updated PTSE with empty contents. Follow the procedures for receiving a PTSE to determine whether or not the PTSE must be flooded to other neighboring peers, after installing the PTSE in the topology database.

Otherwise, the PTSE is put on the PTSE request list, so that it can be requested from a neighboring peer (immediately or at some later time) in PTSE Request packets.

Loading or Full: In either of these states, the node has sent and received an entire sequence of DBSPs. The only packets received should be duplicates. Any other DBSPs received must generate the event DSMismatch, causing the adjacency to revert to the Negotiating state and the two neighboring peers to resynchronize their databases.

The procedures followed when receiving a DBSP in the loading or Full states are the same as those followed in the Exchanging state, except that packets accepted as the next in sequence must generate the event DSMismatch instead, and further processing of such packets must be stopped. Note that receipt of packets with an inconsistent Master bit or with the Initialize bit set to one must also generate the event DSMismatch.

According to this one embodiment of the invention, with respect to assigning database synch resources to neighbor peer FSMs, a node assigns DB synch to a neighbor peer FSM that is in the Negotiating state and is trying to synchronize with its neighbor, from a pool of available DB synch resources. Any DB synch resources that are not assigned to any neighbor peer FSM are known as unassigned DB synch resources. When a neighbor peer FSM is assigned DB synch resources, the Assign Synch Resources event is injected in the corresponding neighbor peer FSM. When a neighbor peer FSM is instructed to relinquish synch resource the Relinquish Synch Resources event is injected into the neighbor peer FSM. The procedures for injecting these two events are described below.

Also according to this one embodiment of the invention, a node must re-evaluate, assign, or relinquish DB synch resources for neighbor peer FSMs. The following scenarios and subsequent procedures apply in this regard:

1) If a neighbor peer FSM enters the Negotiating state from the NPDown state or the Full state then:
   a) If there are any unassigned DB synch resources then one of those DB synch resources arm assigned to this neighbor peer FSM and the Assign Synch Resources event is injected into this neighbor peer FSM.
   b) Otherwise there are no unassigned DB synch resources if this neighbor peer FSM's remote neighbor node Id is higher than this neighbor peer FSM's local node Id, then:
      i) If out of the remaining neighbor peer FSMs that are in the Negotiating state there is at least one that has a remote neighbor node ID lower than this node, then:
         (A) Choose out of the neighbor peer FSMs with a remote neighbor node Id lower than this node (and in the Negotiating state and with synch resources assigned) the one with the lowest remote neighbor node ID and relinquish its synch resources. Inject the Relinquish Synch Resources event into the FSM. Also, assign these newly relinquished synch resources to this neighbor peer FSM and inject the Assign Synch Resources event into this FSM.
      ii) Otherwise, do nothing.
   c) Otherwise, if out of the remaining neighbor peer FSMs that are in the Negotiating state and have synch resources assigned there is at least one that has a remote neighbor node ID lower than this neighbor peer FSM's remote neighbor node Id then:
      i) Choose the neighbor peer FSM that has the lowest remote neighbor node ID, relinquish the synch resources from that neighbor peer FSM and inject the Relinquish Synch Resources event into that FSM. Assign the synch resources to this neighbor peer FSM and inject the Assign Synch Resources event into this FSM.
   d) Otherwise, do nothing.

2) If a neighbor peer FSM enters the Negotiating state from either the Exchanging or Loading state, or the Synch Resources In Use timer has expired for this neighbor peer FSM, then:
   a) If there are any unassigned DB synch resources other than the one being used by this neighbor, then this neighbor continues using these DB synch resources and injects the Assign Synch Resources event into this neighbor peer FSM.
   b) Otherwise if there are no unassigned DB synch resources available for other neighbors, and if out of the remaining neighbor peer FSMs that are in the Negotiating state there is at least one that does not yet have synch resources assigned, and the last received Database Summary packet from the neighbor had the Synch Resources Assigned bit set to one, then:
      i) Choose out of those neighbors the one with the highest remote neighbor node ID. If the chosen neighbor peer FSM is not this one, then relinquish the synch resources from this FSM, inject the Relinquish Synch Resources event into this FSM, assign the synch resources to the chosen FSM and inject the Assign Synch Resources event to the chosen FSM. If the chosen neighbor peer FSM is this FSM then keep the synch resources assigned to this FSM and inject the Assign Synch Resources event into this FSM.
   c) Otherwise, select all remaining neighbor peer FSMs that are in the Negotiating state that do not yet have synch resources assigned, and perform step 2(b)(i) above using this set of neighbor peer FSMs.

3) If a neighbor peer FSM enters the Full state and no longer needs its assigned DB synch resources then relinquish the synch resources from the neighbor peer FSM and:
   a) If there are any unassigned DB synch resources or if there are no other neighbor peer FSMs in the Negotiating state without synch resources, then do nothing,
   b) Otherwise, if out of the remaining neighbor peer FSMs that are in the Negotiating state there is at least one that does not yet have synch resources assigned, and the last received DBSP from the neighbor had the Synch Resources Assigned bit set to one, then:
      i) Choose out of those neighbors the one with the highest remote node ID, assign this neighbor's synch resources to it, and inject that neighbor with the Assign Synch Resources event.
   c) Otherwise, select all remaining neighbor peer FSMs that are in the Negotiating state that do not yet have synch resources assigned, and perform step 3(b)(i) above using this set of neighbor peer FSMs.

4) If a neighbor peer FSM without DB synch resources assigned to it receives a DBSP with the Synch Resources Assigned bit set to one, then:
   a) If there is at least one other neighbor peer FSM in the Negotiating state that does not have Synch Resources In Use timer running, has DB synch resources assigned, and the last received DBSP from the remote neighbor has the Synch Resources Assigned bit set to zero, then:

i) Out of those neighbor peer FSMs, select the one with the lowest remote neighbor node ID and relinquish its synch resources, inject the Relinquish Synch Resources event into its neighbor peer FSM, assign the synch resources to this neighbor and inject the Assign Synch Resources event into this neighbor.

b) Otherwise, do nothing.

Figure 6:
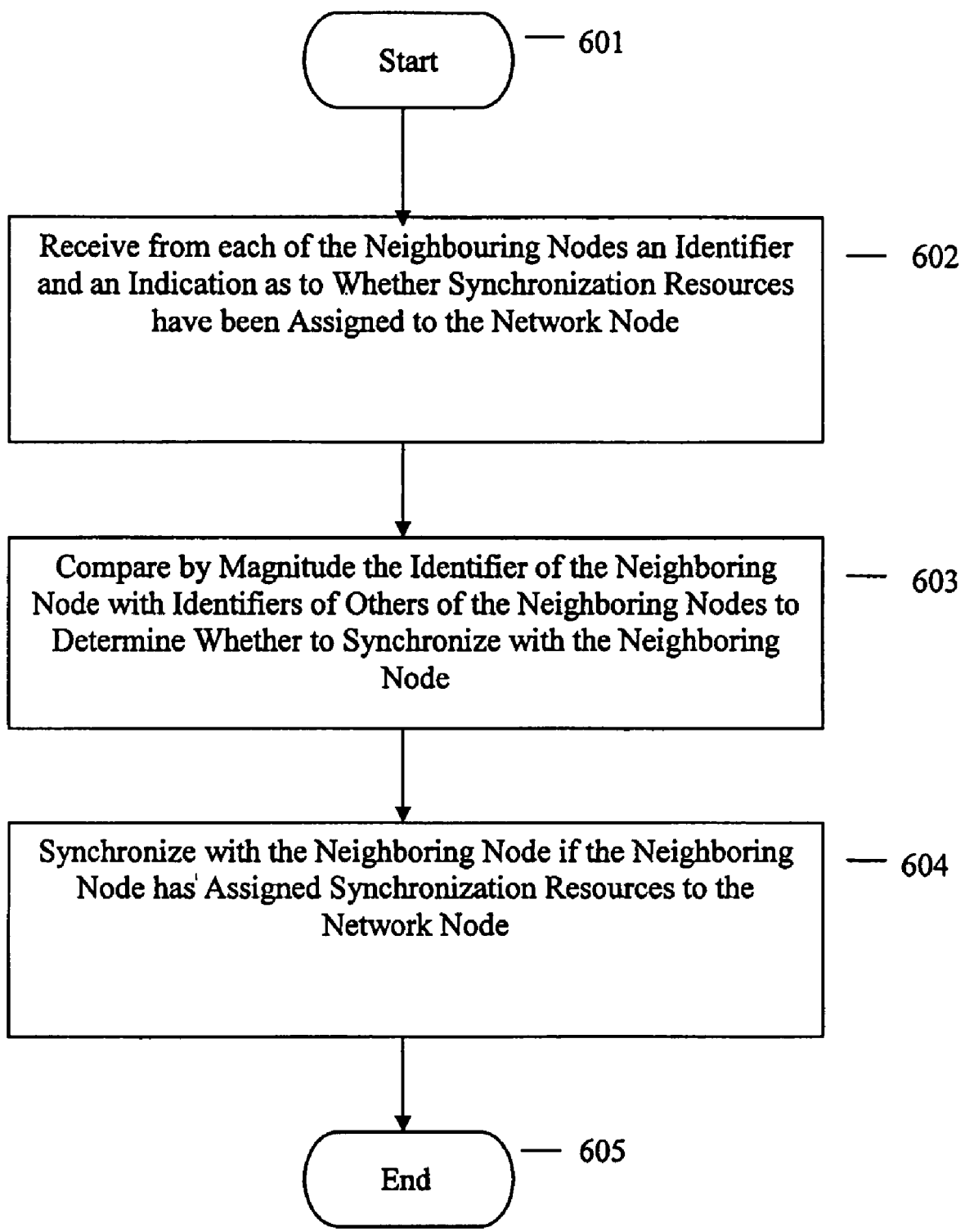

The above described method (i.e., with respect to FIG. 4) may be summarized with the aid of a flowchart. FIG. 6 is a flow chart illustrating operations 600 of software modules 331 within the memory 330 of a data processing system (e.g., 300 in FIG. 3 or A.4 in FIG. 4) for selecting a neighboring node (e.g., A.5 in FIG. 4) to synchronize network topology database information with a network node A.4 from among a plurality of neighboring nodes (e.g., A.1, A.2, A.3, A.5) coupled to the network node A.4 over a network 200, in accordance with an embodiment of the invention.

At step 601, the operations 600 start.

At step 602, an identifier and an indication as to whether synchronization resources have been assigned to the network node A.4 is received from each of the neighboring nodes A.1, A.2, A.3, A.5.

At step 603, the identifier A.5 of the neighboring node A.5 is compared by magnitude (i.e., A.5>A.3>A.2>A.1) with identifiers A.1, A.2, A.3 of others of the neighboring A.3 to determine whether to synchronize with the neighboring node A.5.

At step 604, the neighboring node A.5 is synchronized with (e.g., with A.4) if the neighboring node A.5 has assigned synchronization resources to the network node A.4.

At step 605, the operations 600 end.

The method may further include assigning synchronization resources to the neighboring node A.5. The method may further include sending an indication of assignment of synchronization resources to the neighboring node A.5. The synchronization resources may be at least one of node memory, node input/output capacity, and node processor capacity. Each identifier may be at least one of a unique value, an Internet Protocol ("IP") address, an Asynchronous Transfer Mode ("ATM") address, and a node identification ("ID") number. The indication may be a flag and the identifier may be a field contained in one or more messages communicated over the network 200. The network 200 may be an ATM network. The messages may be at least one of Private Network-Node Interface ("PNNI("Hello protocol messages and PNNI database summary packets. The network node A.4 and each of the plurality of neighboring nodes A.1, A.2, A.3, A.5 maybe at least one of a router, a switch, and a data processing system 300. The method may further include receiving an indication of priority to synchronize with the network node A.4 from each of the neighboring nodes A.1, A.2, A.3, A.5. The method may further include comparing a priority of the neighboring node A.5 with priorities of others of the neighboring nodes A.1, A.2, A.3 to determine whether to synchronize with the neighboring node A.5. And, the step of comparing 603 may further include determining whether the neighboring node A.5 belongs to a group of neighboring nodes (e.g., A.2, A3, A.5) having one of largest (e.g., A.2, A.3, A.5>A.1) and smallest identifier magnitudes, the group having a number of neighboring nodes (e.g., 3) determined by synchronization resources available within the network node A.4.

According to one embodiment of the invention, the above described method may be implemented by a network management data processing system (not shown) coupled to one or more of the network node A.4 and neighboring nodes (A.1., A.2, A.3, A.5) in the network 200.

While this invention is primarily discussed as a method, a person of ordinary skill in the art will understand that the apparatus discussed above with reference to a data processing system 300 (or network node A.4), may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 3 can be contained in a computer software product according to one embodiment of the invention. This computer software product can be loaded into and run by the data processing system 300 of FIG. 3. Moreover, the sequences of instructions which when executed cause the method described herein to be performed by the data processing system 300 of FIG. 3 can be contained in an integrated circuit product including a coprocessor or memory according to one embodiment of the invention. This integrated circuit product can be installed in the data processing system 300 of FIG. 3.

The embodiments of the invention described above are intended to be exemplary only. Those skilled in this art will understand that various modifications of detail may be made to these embodiments, all of which come within the scope of the invention.

What is claimed is:

1. A method for selecting a neighboring node to synchronize network topology database information with a network node from among a plurality of neighboring nodes coupled to the network node in a network, the method comprising:

receiving, from each of the neighboring nodes, an identifier selected from a group consisting of a unique value, an Internet Protocol (IP) address, an Asynchronous Transfer Mode (ATM) address, and a node identification (ID) number, and an indication as to whether synchronization resources have been assigned to the network node;

comparing, for each of the neighboring nodes, the identifier of the neighboring node with identifiers of other neighboring nodes to select at least one neighboring node having an identifier with an extreme value;

assigning synchronization resources to the at least one selected neighboring node; and synchronizing the network node with the at least one selected neighboring node after assigning synchronization resources.

2. The method of claim 1, further comprising the following step:

sending an indication of assignment of synchronization resources to the at least one neighboring node.

3. The method of claim 1 wherein the synchronization resources are at least one of node memory, node input/output capacity, and node processor capacity.

4. The method of claim 1 wherein the indication is a flag and the identifier is a field contained in one or more messages communicated over the network.

5. The method of claim 4 wherein the network is an ATM network.

6. The method of claim 5 wherein the messages are at least one of Private Network-Node Interface ("PNNI") Hello protocol messages and PNNI database summary packets.

7. The method of claim 1 wherein the network node and each of the plurality of neighboring nodes are at least one of a router, a switch, and a data processing system.

8. The method of claim 1, further comprising the following step:
   receiving an indication of priority to synchronize with the network node from each of the neighboring nodes.

9. The method of claim 8, further comprising the following step:
   comparing a priority of the neighboring node with priorities of others of the neighboring nodes to determine whether to synchronize with the neighboring node.

10. The method of claim 1, further comprising the following step:
    determining whether the neighboring node belongs to a group of neighboring nodes having one of largest and smallest identifier magnitudes, the group having a number of neighboring nodes determined by synchronization resources available within the network node.

11. A system for selecting a neighboring node with which to synchronize network topology database information with a network node from among a plurality of neighboring nodes coupled to the system in a network, the system comprising:
    a processor coupled to memory and an interface to the network that;
    receives, from each of the neighboring nodes, an identifier selected from a group consisting of a unique value, an Internet Protocol (IP) address, an Asynchronous Transfer Mode (ATM) address, and a node identification (ID) number, and an indication as to whether synchronization resources have been assigned to the system;
    compares the identifier of the neighboring node with identifiers of other neighboring nodes to select at least one neighboring node having an identifier with an extreme value;
    assigns synchronization resources to the at least one selected neighboring node; and
    synchronizes the network node with the at least one selected neighboring node after assigning synchronization resources.

12. The system of claim 11, wherein the processor
    sends an indication of assignment of synchronization resources to the neighboring node.

13. The system of claim 11 wherein the synchronization resources are at least one of node memory, node input/output capacity, and node processor capacity.

14. The system of claim 11 wherein the indication is a flag and the identifier is a field contained in one or more messages communicated over the network.

15. The system of claim 14 wherein the network is an ATM network.

16. The system of claim 15 wherein the messages are at least one of Private Network-Node Interface ("PNNI") Hello protocol messages and PNNI database summary packets.

17. The system of claim 11 wherein the network node and each of the plurality of neighboring nodes are at least one of a router, a switch, and a data processing system.

18. The system of claim 11 wherein the processor receives an indication of priority to synchronize with the network node from each of the neighboring nodes.

19. The system of claim 18 wherein the processor compares a priority of the neighboring node with priorities of others of the neighboring nodes to determine whether to synchronize with the neighboring node.

20. The system of claim 11 wherein the processor determines whether the neighboring node belongs to a group of neighboring nodes having one of largest and smallest identifier magnitudes, the group having a number of neighboring nodes determined by synchronization resources available within the network node.

21. A computer program product recorded on a computer readable storage medium having computer executable code for directing a data processing system to select a neighboring node with which to synchronize network topology database information with a network node from among a plurality of neighboring nodes coupled to the data processing system in a network, the code comprising:
    code recorded on a computer readable storage medium that receives from each of the neighboring nodes an identifier selected from a group consisting of a unique value, an Internet Protocol (IP) address, an Asynchronous Transfer Mode (ATM) address, and a node identification (ID) number, and an indication as to whether synchronization resources have been assigned to the data processing system;
    code recorded on a computer readable storage medium that compares the identifier of the neighboring node with identifiers of others of the neighboring nodes to select at least one neighboring node having an identifier with an extreme value;
    code recorded on a computer readable storage medium that assigns synchronization resources to the at least one selected neighboring node; and
    code recorded on a computer readable storage medium that synchronizes with the selected neighboring node after assigning synchronization resources.

22. The computer program product of claim 21, further comprising: code recorded on a computer readable storage medium that sends an indication of assignment of synchronization resources to the neighboring node.

23. The computer program product of claim 21 wherein the synchronization resources are at least one of node memory, node input/output capacity, and node processor capacity.

24. The computer program product of claim 21 wherein the indication is a flag and the identifier is a field contained in one or more messages communicated over the network.

25. The computer program product of claim 24 wherein the network is an ATM network.

26. The computer program product of claim 25 wherein the messages are at least one of Private Network-Node Interface ("PNNI") Hello protocol messages and PNNI database summary packets.

27. The computer program product of claim 21 wherein the network node and each of the plurality of neighboring nodes are at least one of a router, a switch, and a data processing system.

28. The computer program product of claim 21, further comprising: code recorded on a computer readable storage medium that receives an indication of priority to synchronize with the network node from each of the neighboring nodes.

29. The computer program product of claim 28, further comprising: code recorded on a computer readable storage medium that compares a priority of the neighboring node with priorities of others of the neighboring nodes to determine whether to synchronize with the neighboring node.

30. The computer program product of claim 21, further comprising: code recorded on a computer readable storage medium that determines whether the neighboring node belongs to a group of neighboring nodes having one of largest and smallest identifier magnitudes, the group having a number of neighboring nodes determined by synchronization resources available within the network node.

\* \* \* \* \*